(12) United States Patent
Notargiacomo et al.

(10) Patent No.: US 11,689,939 B2
(45) Date of Patent: Jun. 27, 2023

(54) ORCHESTRATOR AND INTERCONNECTION FABRIC MAPPER FOR A VIRTUAL WIRELESS BASE STATION

(71) Applicant: John Mezzalingua Associates, LLC, Liverpool, NY (US)

(72) Inventors: Massimo Notargiacomo, Castel Bolognese (IT); Jeffrey Courington, Chester, VA (US); Stephen Turner, Mechanicsville, VA (US); Jeffrey Masters, Ashland, VA (US); Vishal Agrawal, Vernon Hills, IL (US); Francesco Foresta, Faenza (IT)

(73) Assignee: John Mezzalingua Associates, LLC, Liverpool, NY (US)

(*) Notice: Subject to any disclaimer, the term of this patent is extended or adjusted under 35 U.S.C. 154(b) by 86 days.

(21) Appl. No.: 16/668,274

(22) Filed: Oct. 30, 2019

(65) Prior Publication Data
US 2020/0137594 A1 Apr. 30, 2020

Related U.S. Application Data

(60) Provisional application No. 62/802,284, filed on Feb. 7, 2019, provisional application No. 62/753,454, filed on Oct. 31, 2018.

(51) Int. Cl.
*H04W 24/02* (2009.01)
*H04W 8/08* (2009.01)
(Continued)

(52) U.S. Cl.
CPC ........... *H04W 24/02* (2013.01); *H04W 8/082* (2013.01); *H04W 16/16* (2013.01); *H04W 16/18* (2013.01);
(Continued)

(58) Field of Classification Search
CPC ..... H04W 24/02; H04W 8/082; H04W 16/16; H04W 16/18; H04W 16/22; H04W 24/04;
(Continued)

(56) References Cited

U.S. PATENT DOCUMENTS

| 9,258,629 B2 * | 2/2016 | Graves ............... H04Q 11/0062 |
| 9,326,124 B2 | 4/2016 | Jeong et al. |

(Continued)

FOREIGN PATENT DOCUMENTS

| CN | 106537859 A | 3/2017 |
| CN | 104853417 B | 8/2018 |

(Continued)

*Primary Examiner* — Huy D Vu
*Assistant Examiner* — Bailor C Hsu
(74) *Attorney, Agent, or Firm* — Dentons US LLP

(57) ABSTRACT

Disclosed is a virtual wireless base station that can dynamically scale its capacity to meet changes in demand for connectivity. The virtual wireless base station includes a plurality of virtual baseband modules, a plurality of interface/router modules, an orchestrator module and a fabric mapper module. Each of the plurality of virtual baseband modules is coupled to the interface/router modules by a low latency switch fabric. The orchestrator determines current and near future demand for connectivity within the virtual wireless base station and either instantiates and connects new virtual baseband processors to meet a rise in demand, or shuts down underutilized virtual baseband processors in case of insufficient demand.

18 Claims, 8 Drawing Sheets

(51) Int. Cl.
*H04W 16/16* (2009.01)
*H04W 48/10* (2009.01)
*H04W 48/12* (2009.01)
*H04W 48/18* (2009.01)
*H04W 80/02* (2009.01)
*H04W 84/04* (2009.01)
*H04W 88/08* (2009.01)
*H04W 24/04* (2009.01)
*H04W 16/18* (2009.01)
*H04W 16/22* (2009.01)
*H04W 88/18* (2009.01)
*H04W 28/16* (2009.01)

(52) U.S. Cl.
CPC ........... *H04W 16/22* (2013.01); *H04W 24/04* (2013.01); *H04W 28/16* (2013.01); *H04W 48/10* (2013.01); *H04W 48/12* (2013.01); *H04W 48/18* (2013.01); *H04W 80/02* (2013.01); *H04W 84/045* (2013.01); *H04W 88/085* (2013.01); *H04W 88/18* (2013.01)

(58) Field of Classification Search
CPC ..... H04W 28/16; H04W 48/10; H04W 48/12; H04W 48/18; H04W 80/02; H04W 84/045; H04W 88/085; H04W 88/18
See application file for complete search history.

(56) References Cited

U.S. PATENT DOCUMENTS

| | | | |
|---|---|---|---|
| 9,526,041 B2 | 12/2016 | Xu et al. | |
| 10,097,329 B2 | 10/2018 | Chiang et al. | |
| 10,098,004 B2 | 10/2018 | Ahmavaara et al. | |
| 10,129,805 B2 | 11/2018 | Purohit | |
| 10,243,657 B1* | 3/2019 | Atlas | H04B 10/25753 |
| 10,278,081 B2* | 4/2019 | Cotanis | H04W 24/10 |
| 10,567,288 B1* | 2/2020 | Mutnuru | H04L 41/40 |
| 10,595,260 B2* | 3/2020 | Haberland | H02J 1/14 |
| 2002/0143926 A1* | 10/2002 | Maltz | H04L 41/0226 709/224 |
| 2008/0045254 A1* | 2/2008 | Gupta | H04J 3/0647 455/509 |
| 2009/0149221 A1* | 6/2009 | Liu | H04W 88/085 455/561 |
| 2012/0044876 A1* | 2/2012 | Taaghol | H04W 84/042 370/329 |
| 2012/0163299 A1* | 6/2012 | Chen | H04W 56/004 370/328 |
| 2013/0303114 A1 | 11/2013 | Ahmad et al. | |
| 2014/0328178 A1* | 11/2014 | Haberland | H04W 28/08 370/235 |
| 2014/0328204 A1* | 11/2014 | Klotsche | H04L 45/54 370/252 |
| 2015/0334572 A1* | 11/2015 | Nakai | H04W 76/11 455/410 |
| 2016/0295564 A1* | 10/2016 | Landry | H04W 12/06 |
| 2016/0353465 A1* | 12/2016 | Vrzic | H04W 72/29 |
| 2017/0086049 A1* | 3/2017 | Vrzic | H04W 36/18 |
| 2017/0086111 A1* | 3/2017 | Vrzic | H04W 36/023 |
| 2017/0105113 A1* | 4/2017 | Seenappa | H04W 40/246 |
| 2017/0250927 A1* | 8/2017 | Stapleton | H04L 25/02 |
| 2017/0311183 A1 | 10/2017 | Cotanis | |
| 2018/0014312 A1* | 1/2018 | Ezaki | H04W 72/1252 |
| 2018/0287696 A1 | 10/2018 | Barbieri et al. | |
| 2019/0053220 A1* | 2/2019 | Zhang | H04W 36/0058 |
| 2019/0166506 A1* | 5/2019 | Ashrafi | H04W 12/06 |

FOREIGN PATENT DOCUMENTS

| | | |
|---|---|---|
| WO | 2015196722 A1 | 12/2015 |
| WO | 2016005008 A1 | 1/2016 |
| WO | 2018098696 A1 | 6/2018 |

\* cited by examiner

ORCHESTRATOR AND INTERCONNECTION FABRIC MAPPER FOR A VIRTUAL WIRELESS BASE STATION

This application claims the benefit of U.S. Provisional Application No. 62/753,454 filed on Oct. 31, 2018 and No. 62/802,284 filed on Feb. 7, 2019, the contents of which are all hereby incorporated by reference herein in their entirety.

BACKGROUND OF THE INVENTION

Field of the Invention

The present invention relates to wireless communications, and more particularly, to systems and components that enable virtual wireless base stations.

Related Art

A wireless communication network, such as an LTE or 5G network, is generally made up of a Radio Access Network, a core network, and an interface to the internet. It is through the Radio Access Network (RAN) that handsets and other user devices (generally referred to us User Equipment (UEs)) exchange messages and data packets that make up the user's telephone calls, emails, texts, and web browsing. The Radio Access Network comprises multiple base stations, each of which is coupled to one or more antennas via radio remote units. Each of the base stations generates and receives wireless signals at prescribed frequencies and encoding schemes, over which UEs within reach of the wireless signals can connect to and communicate with the internet. These base stations provide for the complex signaling between each UE and the core network so that appropriate connections are maintained with each of the UEs. In doing so, transmissions occur using dynamically-determined frequencies, modulation schemes, and multiple-input multiple-output (MIMO) layers to optimally distribute the data communications resources to each UE.

Conventional Radio Access Networks, and their constituent base stations, suffer from the following disadvantages. Conventional base stations are individually engineered to accommodate an anticipated peak concurrent number of wireless communication devices and their corresponding connections and are thus overdesigned to meet a fixed peak capacity level. Peak concurrent usage often occurs for only a brief period on any given day or week, and usage patterns often vary widely from one wireless coverage area to another. For example, peak concurrent usage within an office building in a commercial business district might occur at 2:00 pm, while peak concurrent usage within an apartment building in a residential community might occur at 8:00 pm, and peak concurrent usage within a stadium may only occur for several hours once every several weeks. In the case of a stadium, the contrast between nominal low demand and peak demand may be the difference between 500 and 100,000 active connected users. The result is a network of base stations that are individually over-engineered at fixed peak capacity levels resulting in significantly higher than necessary costs for each individual base station as well as for the entire wireless communication system collectively.

Accordingly, what is needed is a virtualized base station that can expand and contract its capacity to meet the current demand for connectivity in a given coverage area, and to do so while meeting stringent latency requirements of telecommunications standards like LTE and 5G.

SUMMARY OF THE INVENTION

An aspect of the present invention involves a non-transitory machine readable memory encoded with instructions which, when executed by one or more processors, cause the one or more processors to perform a process, comprising determining a demand for connectivity to a wireless communications access network; determining a combination of component modules based on the demand for connectivity, the combination of component modules including at least one baseband module; determining a plurality of interconnect channels between the at least one baseband module and other component modules within the combination of component modules; instantiating each component module within the combination of component modules; connecting the at least one baseband module to at least one external network component; and connecting the at least one baseband module to at least one user equipment (UE).

Another aspect of the present invention involves a non-transitory machine readable memory encoded with instructions which, when executed by one or more processors, cause the one or more processors to perform a method, comprising; determining a demand for connectivity to a wireless communications access network, the wireless communications access network having at least one baseband module; determining whether a capacity corresponding to the at least one baseband module is sufficient to meet the demand; instantiating at least one additional baseband modules; connecting the at least one additional baseband module to at least one external network component; and instructing at least one of the plurality of baseband modules to handover one or more UEs to the at least one additional baseband module.

Another aspect of the present invention involves a non-transitory machine readable memory encoded with instructions which, when executed by one or more processors, cause the one or more processors to perform a method, comprising determining a demand for connectivity within a wireless communications access network, the wireless communications access network having a plurality of baseband modules; designating one of the plurality of baseband modules as an underutilitzed virtual baseband module, based on the demand for connectivity; instructing the underutilitzed baseband module to handover a plurality of connected UEs to a recipient baseband module within the plurality of baseband modules, the recipient baseband module corresponding to a neighboring cell group; and shutting down the underutilized baseband module.

Another aspect of the present invention involves a virtual wireless base station, comprising a plurality of routing means; a plurality of baseband processing means; an orchestrating means; a switching means for low latency switching coupled between the plurality of routing means and the plurality of baseband processing means; and a mapping means for fabric mapping, the mapping means for fabric mapping coupled to the means for orchestrating and the switching means for low latency switching.

Another non-transitory machine readable memory encoded with instructions which, when executed by one or more processors, cause the one or more processors to perform a process for mitigating intercell interference between two cell groups, each of the two cell groups having a corresponding baseband module, wherein each baseband module is coupled to a low latency switch fabric, comprising identifying two baseband modules experiencing intercell interference with at least one UE within a common coverage area of the two cell groups; identifying a frequency band corresponding to the intercell interference; instantiating a coordinator module, wherein the coordinator module is coupled to the low latency switch fabric; coupling the coordinator module to the baseband modules via the low latency switch fabric; and performing intra-frame coordination between the two baseband modules.

Another aspect of the present invention involves a wireless base station. The wireless base station comprises a plurality of cell groups, each cell group having a corresponding baseband module, each of the baseband modules coupled to a low latency switch fabric; and a hardware compute environment, the hardware compute environment having a non-transitory machine readable medium instructions encoded to execute a process. The process comprises identifying two baseband modules experiencing intercell interference with at least one UE within a common coverage area of the two cell groups; identifying a frequency band corresponding to the intercell interference; instantiating a coordinator module; coupling the coordinator module to the low latency switch fabric; coupling the coordinator module to the baseband modules via the low latency switch fabric; and performing intra-frame coordination between the two baseband modules.

DESCRIPTION OF EXEMPLARY EMBODIMENTS

Figure 1:
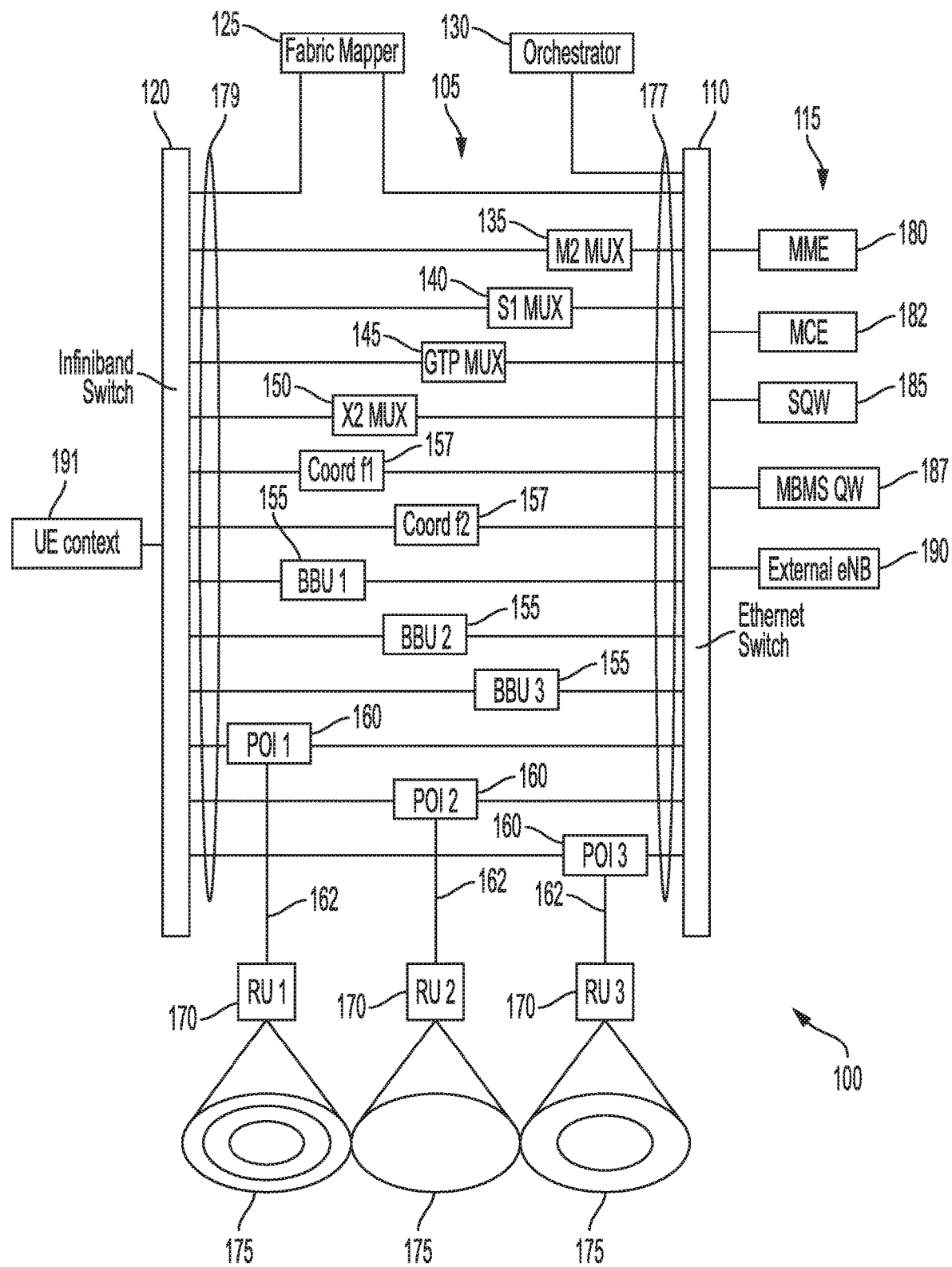
FIG. 1 illustrates an exemplary virtual base station system according to the disclosure.

Disclosed is a virtual base station hosting environment and architecture that enables partitioning of one or more wireless base stations (e.g., one or more eNodeBs) into virtualized components that can be individually and dynamically created, reconfigured, and shut down.

With virtual implementations, base station components can be dynamically created, reconfigured, and shut down to respond to fluctuations in demand. Further, considerable cost savings can be achieved by making use of commercial off-the-shelf server hardware. However, deployment of virtual base stations presents technical challenges. For example, given the stringent latency requirements governing telecommunications standards such as LTE and 5G, inter-task communications between virtualized components places extraordinary demands on conventional computer hardware, particularly if these virtualized components are dynamically created, reconfigured, and shut down in response to fluctuations in demand.

In the case of LTE, according to the disclosure, a virtual based station or eNodeB can be partitioned such that its S1, X2, GTP, and M2M interface functions are separately encapsulated in individual software objects (hereinafter "interface/router" components) that may be shared among several virtual baseband processors. In doing so, for example, a standalone software-based S1 interface may serve as a router between multiple software-based baseband processors and one or more MMEs within the core network. Further, a virtual baseband processor can be partitioned among its protocol stack layers so that bottleneck protocol stack functions can be parallelized into multiple components or process threads for greater speed. This enables creating one or more baseband processors having many cells that can be easily coordinated. This may simplify the communication with the MMEs over the S1 interface because there can be fewer baseband processors, each of which having greater capability. In case of two interfering cells under different virtual baseband processors, the two interfering cells can be migrated into a single running baseband processor so that all the constituent UEs can be scheduled by a single scheduler, or a new baseband processor can be created for hosting the two interfering cells.

Enabling these features requires a server hardware compute environment with a plurality of multiprocessor boards interconnected by a high speed switching fabric. An example would include multiple server boards, each of which equipped with Infiniband PCIe Adaptors that run at 100 Gbps or 200 Gbps connected between the servers through an Infiniband switch (for example, a 36 port 100 Gbps switch). The Infiniband components allow for a very low latency (sub 600 nsec on PCIe cards, 90 nsec port to port on the switch) with sufficient bandwidth to enable high performance clustering. The different virtual baseband processors and interface/router components may communicate via RDMA (Remote Direct Memory Access), either directly over shared memory within a single board, or over interconnect channels between boards, such as Infiniband. Further, the use of a low latency switch fabric may be enhanced through the incorporation of data plane improvement techniques, such as DPDK (Data Plane Development Kit), which enables packet processing workload acceleration. It will be understood that variations to this hardware compute environment are possible and within the scope of the disclosure.

In order to make proper use of this hardware platform and host multiple partitioned baseband processors along with centralized S1/X2/GTP/M2M interface modules, two software entities are required: an orchestrator, and an intermodule channel mapper (hereinafter "fabric mapper"), which are described below.

FIG. 1 illustrates an exemplary virtual base station system 100 according to the disclosure. System 100 includes a plurality of component modules 105. Each of the component modules 105 is coupled to an Ethernet switch 110 via an Ethernet connection 177, and to a high bandwidth low latency switch fabric 120. An example of a suitable high bandwidth low latency switch fabric 120 may include an Infiniband switch as described above, although other switching technologies, such as Omni-Path or Ethernet may be used, if they can meet the latency requirements. In illustrated exemplary system 100, the component modules 105 include three baseband processor unit (BBU) modules 155 and four interface/router component modules: M2Mux 135; S1Mux 140; GTPMux 145; and X2Mux 150. Each of the BBU modules 155 may be coupled to each of the four interface/router component modules via a dedicated interconnect channel established within low latency switch fabric 120.

Coupled to Ethernet switch 110 are standard external network components 115. In an LTE-based exemplary implementation, external components 115 may include an MME (Mobility Management Entity) 180; an MCE (Multicell/Multicast Coordination Entity) 182; an SGW (Serving Gateway) 185; an MBMS GW (Multimedia Broadcast Multicast Service Gateway); and one or more external eNodeBs 190. Each of these external network components are coupled to their respective interface/router component modules via Ethernet switch 110 according to their respective interface protocols (e.g., SCTP between MME 180 and S1Mux 140, GTP between SGW 185 and GTPMux 145 and between the MBMS GW 187 and the GTPMux 145, M2 between MCE 182 and M2Mux 135, and X2 between the one or more external eNodeBs 190 and X2Mux 150).

Each of the three illustrated BBUs 155 may be coupled to a corresponding POI/DAS (Point of Interface/Distributed Antenna System) component module 160 via low latency switch fabric 120. Further, each POI/DAS component module 160 may be coupled to a radio remote unit 170 via a CPRI (Common Public Radio Interface) connection 162, and remote unit 170 may be coupled to one or more antennas (not shown) via an RF distribution connection. Each CPRI connection 162 may be implemented with a dedicated PCIe CPRI card that may be installed on one or more of the server boards hosting system 100. Although system 100 is illustrated with individual dedicated CPRI connections 162, it will be understood that these may be implemented with a CPRI switch (not shown) that may route CPRI traffic between POI/DAS component modules 160 and the remote units 170. In a further variation, the CPRI connections 162 may be implemented using low latency switch fabric 120, such as an Infiniband switch, whereby the remote units 170 may be directly coupled to low latency switch fabric 120. In a further variation, one or more of the BBU modules 155 may be directly coupled to one or more remote units 170 via a CPRI connection 162, whereby there is no intervening POI/DAS module 160. Additionally, given the latency requirements, one or more of the CPRI connections 162 may be instead implemented with an Ethernet connection. It will be understood that such variations are possible and within the scope of the disclosure.

In another variation, one or more BBU modules 155 may, instead of having a standard LTE protocol stack implementation, may be a special-purpose protocol stack, such as for specifically servicing bandwidth-restricted NB-IoT UEs. In some cases, this special-purpose BBU module 155 may be assigned its own spectrum and operate independently of the other BBU modules 155. In this case, the special-purpose BBU module 155 may be coupled to a dedicated remote unit 170. In a variation, an NB-IoT BBU module 155 may operate in a guard band frequency within the frequency band of a separate standard LTE BBU module 155. In this case, the special-purpose BBU module 155 may be coupled to a remote unit 170 that is shared with the standard LTE BBU module 155, in which case their corresponding RF signals are merged within remote unit 170. In other cases, there may be a need for coordination in a given band, in which a special purpose BBU module 155 and a standard LTE BBU module 155 may share a set of resource blocks within a given LTE frame, with coordination being handled by a coordinator module 157. This is described further below.

Each radio remote unit 170 and its corresponding antenna (not shown) may cover a given cell group 175. As used herein, a cell group 175 may be considered the baseline unit of granularity in scaling system 100. A cell group 175 may be defined as, at a minimum, a single antenna range covering all of the bands handled by that given antenna/remote combination, including all of the MIMO layers existing at a given time. In the case of multiple bands, any given UE within that cell group may be transmitting and receiving in any combination of available bands, and the corresponding BBU module 155 independently schedules all of the UEs within the given cell group 175 using carrier aggregation methods. At a maximum, a cell group 175 may comprise multiple antenna gain patterns, multiple bands within each gain pattern, and all of the MIMO layers available at a given point in time. In this case, the corresponding BBU module 155 may be communicating with multiple POI/DAS modules 160 and multiple corresponding remote units 170 to independently schedule all of the UEs within range. In each of these range of cases, a single BBU module 155 handles a single cell group 175, and the size and complexity of the cell group may vary.

Variations to remote unit 170 are possible and within the scope of the disclosure. For example, remote unit 170 may be a conventional remote radio head for a DAS system, an Active Antenna System, or an advanced remote unit such as a Cell Hub unit (offered by JMA Wireless). Although exemplary system 100 is illustrated as having three POI/DAS (Point Of Interface/Distributed Antenna Systems) 160, it will be readily understood that variations are possible. For example, any of them may instead be a macro cell, small cell, etc., and that any combination of these are possible and within the scope of the disclosure. Further, although three BBUs 155 and POI/DAS 165 are illustrated, it will be understood (as disclosed further below) that more or fewer are possible and within the scope of the disclosure.

System 100 further has an orchestrator module 130, a fabric mapper module 125, and one or more coordinator modules 157, each of which are described below.

Each of the four interface/router modules contains functionality conventionally performed by an individual eNodeB. According to the disclosure, these interface functions have been partitioned from the BBU functionality and encapsulated in individual components that may service more than one BBU 155 (three according to the exemplary embodiment of system 100, although more or fewer BBUs 155 are possible and within the scope of the disclosure). Accordingly, system 100 may be considered as having three eNodeBs, whereby a given eNodeB includes a BBU 155 and its respective interface functionality is performed by the interface/router component modules.

All of the component modules 105 may comprise machine readable instructions that are encoded within one or more non-transitory memory devices and executed on one or more processors that are coupled to Ethernet connection 110 and low latency switch fabric 120. As used herein, the term "non-transitory memory" may refer to any tangible storage medium (as opposed to an electromagnetic or optical signal) and refers to the medium itself, and not to a limitation on data storage (e.g., RAM vs. ROM). For example, non-transitory medium may refer to an embedded memory that is encoded with instructions whereby the memory may have to be re-loaded with the appropriate machine-readable instructions after being power cycled. Each of the component modules 105 may be hosted on one or more multiprocessor server boards according to the hardware compute environment described above. Variations to the how the component modules 105 are deployed on the hardware compute environment are possible. For example, in one variation, component modules 105 on the same server board may communicate via shared memory, and component modules on different server boards may communicate over an interconnection channel via low latency switch fabric 120. In another variation, the entire suite of base station component modules 105 may be deployed within a virtual machine or container(s) on top of physical machines using RDMA between base station component modules sharing a server board and using RDMA over interconnection channels within low latency switch fabric 120 between base station component modules on different server boards. In another variation, the component modules 105 may be deployed in a virtual machine or container(s) on top of physical machines, with all of the component modules 105 communicating via low latency switch fabric 120 via virtual addressing, regardless of whether the underlying physical instantiations of any given pair of component modules 105 share a physical node (server board) or not. Exemplary software containers may include Docker containers or rkt pods, or any similar software package that enables application containerization. Further, a mix of containers, VMs, and processes running on bare metal are possible. However, an advantage to containerization includes the fact that they can be spun up very quickly, and are very light in terms of size, due to the fact that they encapsulate minimal OS components. However, an advantage of one or more VMs is that they allow for persistent memory usage and state-driven operation. It will be understood that such exemplary variations are possible and within the scope of the disclosure.

Coupled to Ethernet connection 110 is orchestrator 130. Orchestrator 130 may be a software module comprising machine readable instructions encoded in a memory, such as a non-transitory memory, whereby when executed by one or more processors, performs the following functions, in no particular order. First, orchestrator 130 determines the current and near-future traffic demand for system 100 on startup as well as during operation of system 100. Second, orchestrator 130 monitors the performance of system 100 by measuring the performance of each BBU module 155 and/or receiving measurement reports from each BBU module 155 and adjusts the capacity of system 100 in response to the monitored performance as well as to changes in demand Orchestrator 130 may adjust the capacity of system 100 by performing specific functions that include the following: creating new BBUs 155; shutting down unnecessary BBUs 155; and merging or dividing cell groups, thereby adjusting the capacity of a given BBU module 155. Third, orchestrator 130 may improve the performance of system 100 by coordinating the allocation of cells 175 to corresponding BBUs 155. In the event that there are multiple UEs within range of two cell groups, and in order to minimize the complication of having two BBU modules 155 having to coordinate scheduling of multiple UEs within two overlapping antenna ranges, orchestrator 130 may merge the two existing cell groups 175 into a single cell group 175 so that a single scheduler within a single BBU module 130 may handle the scheduling of the greater coverage area. Alternatively, orchestrator 130 may instantiate one or more coordinator modules 157 that may assist in the coordination of scheduling between two interfering BBUs 155 at a given serving frequency (described further below). Alternatively, orchestrator 130 may execute instructions to create a new BBU 155 and migrate both co-interfering cells 175 to it. Orchestrator 130 may be coupled to each component via Ethernet connection 110 for issuing commands and receiving status information, etc.

Another function of orchestrator 130 is to command the fabric mapper 125 to set up, modify, and shut down interconnect channels within low latency switch fabric 120 so that component modules 105 may communicate with each other with minimal latency and sufficient bandwidth.

Orchestrator 130 may be implemented using a Container Orchestration Engine (COE), such as Kubernetes, or another software suite that provides additional functionalities to a hypervisor/container runtime. Orchestrator 130 may delegate certain functions (e.g., health check of component modules 105, on-demand deployment, etc.) to the COE.

As mentioned above, each of the four interface/router components: M2Mux 135, S1Mux 140, GTPMux 145, and X2Mux 150, performs the standard communications between each BBU module 155 and its corresponding external network component 115. S1Mux 140 serves as an interface and router between each of the BBUs 155 and the MME 180. S1Mux 140 may have two ports: one that connects to Ethernet switch 110 using SCTP, and one that connects to low latency switch fabric 120. The connection from S1Mux 140 to the low latency switch fabric 120 may be in the form of S1-AP messages that are packaged in the form of Infiniband packets. For DL (downlink) communications from the MME 180, S1Mux 140 executes instructions to intercept the SCTP-formatted message from the MME 180, retrieves the eNodeB identifier from the message, strips off the SCTP-related information from the message to convert it to an S1-AP message, and routes the message to an interconnect channel within Infiniband switch 110 that corresponds to the eNodeB identifier of the intended BBU 155. In doing so, S1Mux 140 may execute instructions to perform, for example, an RDMA memory write to memory allocated to the target component module via the dedicated interconnect channel within low latency switch fabric 120. In the case of UL (uplink) communications from a given BBU 155 to the MME 180, S1Mux 140 receives a message from the BBU 155 via the BBU's dedicated interconnect channel within low latency switch fabric 120, converts the S1-AP message to an SCTP format, and transmits the message to the MME 180 via Ethernet connection 110. The structure and function of the other interface/router components may be substantially similar, with the primary difference in the particulars of translating the specific interface protocol data structure to translate the message between an Ethernet-based protocol and a format for relaying through the low latency switch fabric 120.

The GTPMux 145 primarily serves as a router between the SGW 185 and each of the BBU modules 155. The GTPMux 145 may have the following ports: an Ethernet port for communicating with the SGW 185 via Ethernet switch 110; and one or more second ports, one for communicating with each of the BBU modules 155 over low latency switch fabric 120. As described, the ports of GTPMux 145 are bidirectional. As with S1Mux 140, GTPMux 145 may be configured so that the SGW 185 is not aware that it is communicating directly with an intervening interface/router component module and not directly with each BBU module 155 as it would with a conventional eNodeB. M2Mux 135 serves as a router in a manner similar to GTPMux 145, but handling MBMS (Multimedia Broadcast Multicast Services) traffic from the MBMS GW 184 to each of the BBU modules 155.

Figure 2:
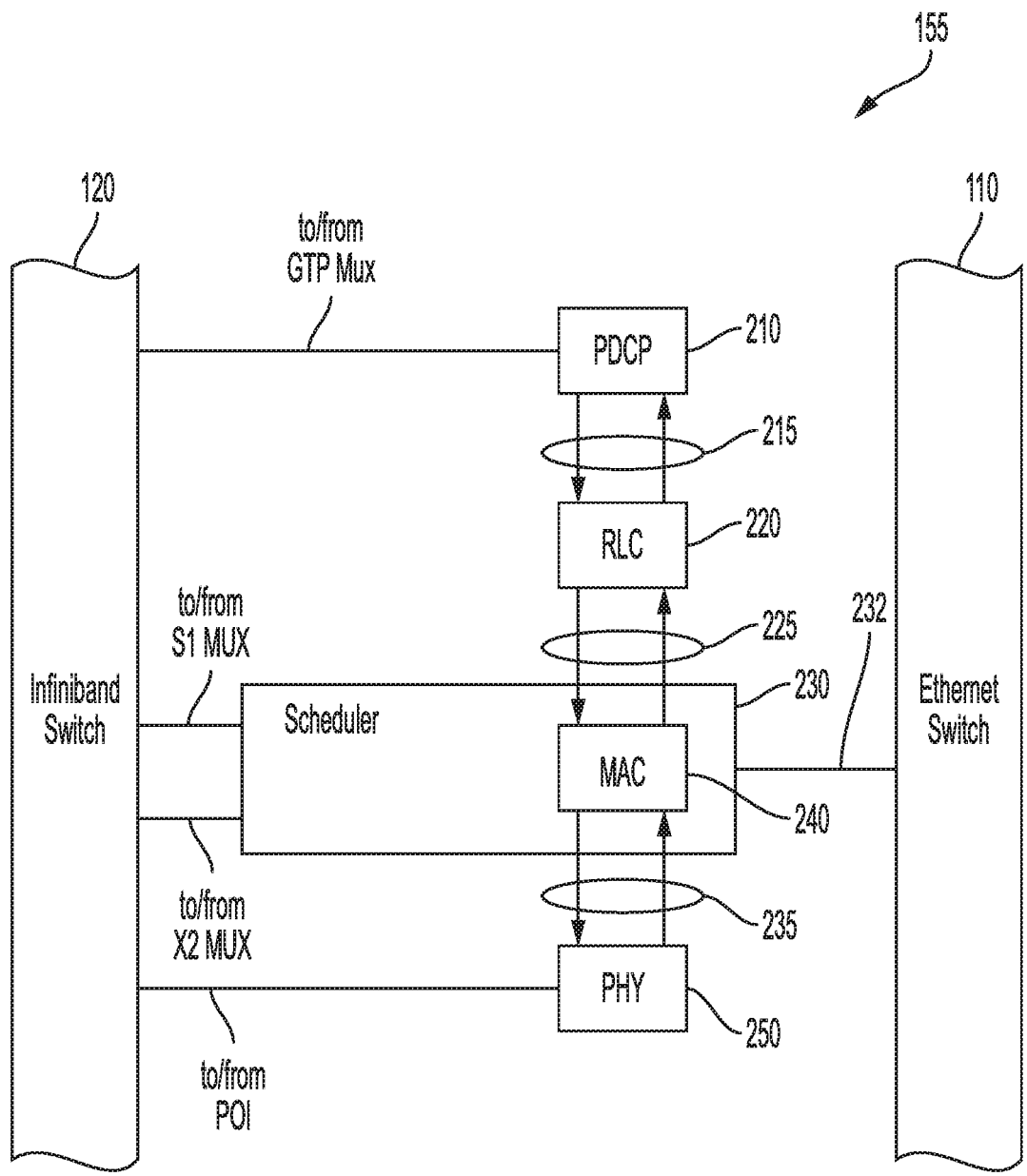
FIG. 2 illustrates an exemplary baseband processing module according to the disclosure.

FIG. 2 illustrates an exemplary implementation of a BBU module 155. As used herein, the term Baseband Processor or BBU may refer to a software-implemented vertical LTE or 5G protocol stack with its interface functionalities partitioned out and handled by one of the interface/router modules. Each BBU module 155 may be a software module having machine readable instructions, encoded within one or more non-transitory memory components within the hardware compute environment of system 100, so that when executed by one or more processors within the hardware compute environment of system 100, each BBU 155 perform protocol stack and scheduling functions. As illustrated in FIG. 2, an exemplary BBU 155 may include a PDCP (Packet Data Convergence Protocol) component 210; a RLC (Radio Link Control) component 220; a MAC (Medium Access Control) component 230; and PHY (Physical layer) component 250. Each BBU module 155 communicates with each of the external network components 115 via its corresponding interface/router component as described above. Each BBU module 155 is also coupled to a CPRI connection 160 for bidirectionally transmitting I/Q (in-phase/quadrature) signal data between the BBU module 155 and its corresponding POI/DAS 165. This is a variation in which each BBU module 115 may be directly coupled to the POI/DAS module 160 via a CPRI connection.

As illustrated in FIG. 2, for each BBU module 155, its PDCP module 210 may be coupled to the low latency switch fabric 120 for relaying uplink/downlink data traffic with the GTPMux 145. PDCP module 210 and RLC module 220 may be linked by uplink/downlink connections 215, which may respectively be implemented via shared memory or via an interconnect channel via low latency switch fabric 120. A similar implementation may be used for the uplink/downlink connections 225 between RLC layer 220 and MAC layer 230. Uplink/downlink connections 215 and 225 may be bearer-based, which means that data is transmitted over these connections once a UE has connected to BBU module 155, and the extent of traffic over uplink/downlink connections 215 and 225 is a function of the number of active bearers.

Schedule module 230 and MAC module 240 (which may be a subcomponent of scheduler 230) may perform the majority of the scheduler functions and control plane signaling of BBU module 155. MAC module 240 may incorporate additional functionality to coordinate scheduling with other BBU modules 155 via one or more coordinator 157, to receive configuration information from orchestrator 130 and fabric mapper 125, and to provide measurement reports and status information to orchestrator 130. To accommodate these functions, MAC module 240 may have an Ethernet connection 232 to Ethernet switch 110 by which it may communicate with these other component modules. MAC module 240 may also be coupled to low latency switch fabric 120 for communicating S1-AP signaling messages to/from S1Mux 140.

PHY module 250 performs the PHY layer functionality expected in an LTE or 5G implementation. PHY module 250 may operate as separate components or threads, with one thread per carrier, and one thread for each MIMO layer for each carrier, and one for uplink and one for downlink. Each of the PHY modules 250 may communicate with the MAC module 240 via PHY links 235. PHY links 235 may have a dedicated communication link for each PHY module thread 250. These links may be over shared memory, or may be over a dedicated interconnect channel over low latency switch fabric 120. Each PHY module thread 250 may further have a dedicated interconnect channel over low latency switch fabric 120 to a designated POI/DAS module 160. Alternatively, each PHY module thread 250 may be coupled over a high speed link (e.g., PCIe) to a CPRI card, which is in turn coupled to a remote unit 170 over CPRI connection 162.

Returning to FIG. 1, fabric mapper module 125 may be a software module comprising machine readable instructions encoded in a memory, such as a non-transitory memory, whereby when executed by one or more processors, performs the following functions. It establishes interconnect channels within low latency switch fabric 120 (for example) for each interconnect channel between base station component modules 105. For example, fabric mapper 125 may establish a plurality of interconnect channels (e.g., one for each LTE bearer) between each BBU 155 and each respective interface/router component such that each interconnect channel may provide for RDMA access between the two components so that data may be exchanged with sufficient bandwidth and sufficiently low latency for each BBU to provide base station functionality within a given telecommunication standard (e.g., LTE) requirements. Depending on the nature of the interconnection (what is being connected to what), the latency and bandwidth requirements may differ. To accommodate this, fabric mapper 125 may include a table of configuration data corresponding the latency and bandwidth requirements of each interconnect channel combination (e.g., BBU/S1Mux, BBU/GTPMux, BBU1/BBU2 via X2Mux, etc.) and allocate the interconnect channels appropriately (e.g., range of memory allocated to RDMA, etc.). In the case where each BBU is further partitioned into protocol subcomponents, fabric mapper 125 may set up interconnect channels between them (e.g., between a given BBU 155 MAC module 240 and its corresponding PHY module 250.

Depending on how orchestrator 130 provisioned resources for each base station component module, fabric mapper 125 determines a path through low latency switch fabric 120 to create interconnect channels between the component modules. Once the fabric mapper 125 has determined the interconnect channels, it communicates the relevant interconnect channel information (e.g., memory addresses, port numbers, etc.) to each of the other module components.

Depending on the expected bandwidth requirements between two component modules 105, fabric mapper 125 may establish an array of memory to be shared between the two component modules for its dedicated interconnect channel within low latency switch fabric 120.

Fabric mapper 125 works with the orchestrator 130 so that if a given BBU module 155 goes down, the orchestrator 130 may execute instructions to instantiate a replacement BBU module 155 and provide relevant address information to the fabric mapper 125 so that the fabric mapper 125 may execute instructions to map a new set of interconnect channels within low latency switch fabric 120 and provide information regarding the new set of interconnect channels to the new replacement BBU 155. In doing so, fabric mapper 125 may act as an Infiniband Subnet Manager (or in conjunction with an Infiniband Subnet Manager) as part of its function.

Fabric mapper 125 may also provide redundancy for enhanced robustness of system 100. For example, orchestrator 130 may determine that a substantial increase in traffic may be pending (e.g., half-time at a football stadium for a set of cells 175 covering the stadium's concessions area). Given this, orchestrator 130 may execute instructions to notify fabric mapper 125 of the need for additional resources. In response, fabric mapper 125 may execute instructions to preemptively map interconnect channels for additional BBU modules 155, and maintain them in an interconnect channel pool for rapid deployment if needed.

Low latency switch fabric 120 may include one or more hardware components that interconnect processors within a single server board as well as interconnect processors spread across multiple server boards. In the example in which the low latency switch fabric 120 is an Infiniband switch, in accordance with the Infiniband specification, the actual hardware connections may include fiber optics, circuit board traces, twisted pair wired connections, etc. Associated software that implements the specific Infiniband functions may be stored on and run in the low latency switch fabric 120 hardware components.

Although the disclosure describes interconnection channels and the hardware compute environment using Infiniband components, it will be understood that other interconnect fabric technologies are possible and within the scope of the disclosure, provided that they enable sufficiently high bandwidth and sufficiently low latency for inter task communication between base station component modules such that they conform to the LTE and/or 5G specifications.

Startup and Configuration

Figure 3:
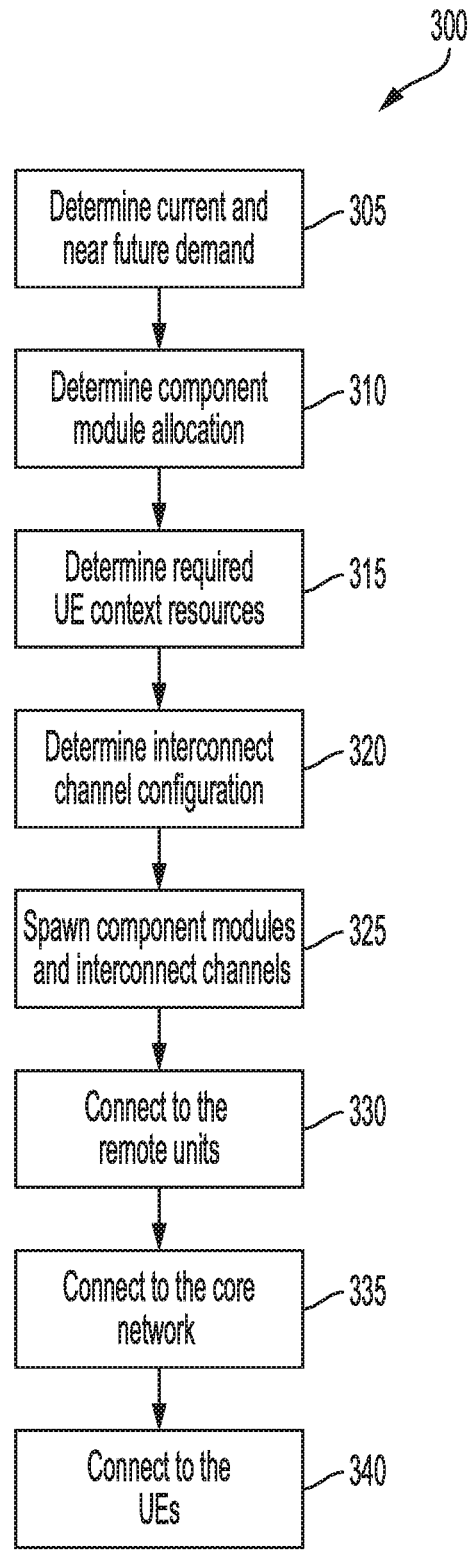
FIG. 3 illustrates an exemplary process for starting up and initializing a virtual base station according to the disclosure.

FIG. 3 illustrates an exemplary process for starting up and configuring a virtual base station 100 according to the disclosure.

In step 305, orchestrator 130 executes instructions to determine a current demand, near-future demand, and demand volatility for the wireless network in which virtual base station 100 is being deployed. In doing so, orchestrator 130 may retrieve information from a configuration file or other source of information. In an exemplary embodiment, orchestrator 130 may obtain current demand, near-future demand, and demand volatility via an ACCS (Adaptive Connection Control System) like that disclosed in U.S. patent application Ser. No. 15/918,799, SYSTEM AND METHOD FOR ADAPTIVELY TRACKING AND ALLOCATING CAPACITY IN A BROADLY-DISPERSED WIRELESS NETWORK, which is incorporated by reference as if fully disclosed herein. However obtained, the information may include the following: (a) an estimate of the current demand for connectivity, which may include the number of actively connected devices (e.g., in an LTE RRC Connected State) and the number of idle devices (e.g., in an RRC Idle State) in the vicinity in which system 100 will be deployed, the Device Category of these devices (e.g., Cat 0-8, Cat M, etc.), and the expected QCIs (Quality of Service Class Indicators) of the bearers associated with the connected UEs; (b) trend information pertaining to the estimated near-future demand for connectivity, which may include an extrapolation of recent trend data, or an estimate based on historical data; and (c) the volatility in the demand for connectivity, which may include expected deviation in demand over a limited course of time. An example of high volatility might include an urban center near a subway station, in which at rush hour a periodic surge of pedestrians enters and exits the coverage of a given cell group 175 as each subway train discharges passengers. Another example of volatility might include a venue such as a stadium, in which large numbers of spectators may suddenly move from one area to another given a break in the event being held. In each of these examples, in addition to any steady state demand for connectivity, there may be periods of surges and drops in demand by devices of different Device Category. Orchestrator 130 may obtain this data and use it for appropriately configuring the system 100 about to be deployed.

In determining current and near-future demand, orchestrator 130 may (either on its own or via the aforementioned ACCS) execute instructions to obtain or retrieve historical information regarding demand for connectivity at the location corresponding to system 100. This may include hour of day, day of the week, month, the occurrence of a given event (e.g., sports event, holiday, concert, prediction of extreme weather, etc.). Orchestrator 130 may implement a look-ahead algorithm to determine current and near-future demand given this information. It will be understood that variations to step 305 are possible and within the scope of the disclosure.

In step 310, orchestrator 130 executes instructions to determine an appropriate allocation of component modules 105 to properly meet the demand and volatility determined in step 305.

Figure 4:
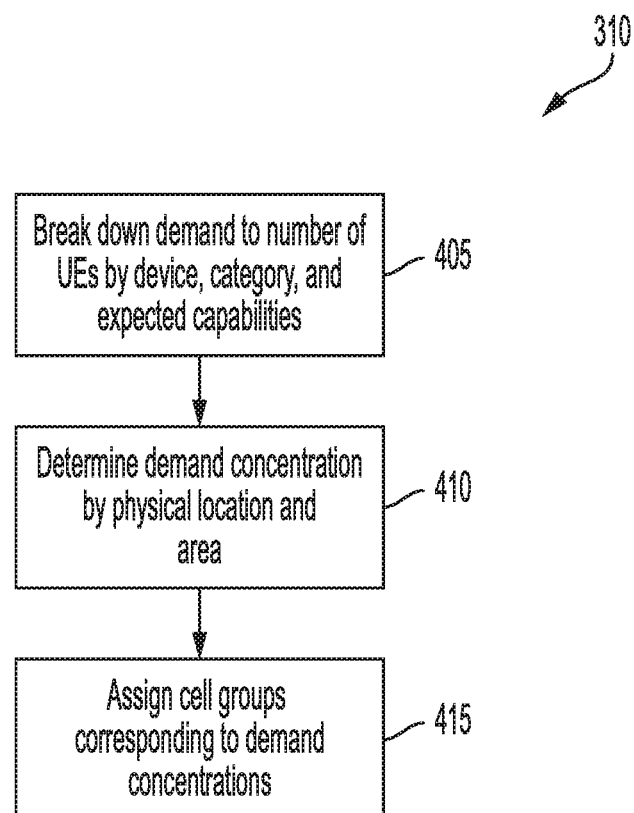
FIG. 4 illustrates an exemplary process for allocating component modules to meet current and near-future demand for connectivity according to the disclosure.

FIG. 4 illustrates an exemplary process by which orchestrator 130 may perform step 310.

In step 405, the orchestrator 130 executes instructions to break down the demand determined in step 305 to a number of expected UEs, by device category and their expected capabilities.

In step 410, the orchestrator 130 executes instructions to determine the demand concentration by physical location and area within the coverage area of system 100. In doing so, orchestrator 130 may retrieve from demand data (obtained in step 305) cell identifier information corresponding to the UEs in both the connected and idle states, and correlate with physical location information corresponding to the cell identifiers. The result of this is a map-like representation of the area covered by system 100 and the expected locations and concentrations of the UEs corresponding to the expected demand, and potentially the expected times corresponding to these concentrations and distributions.

In step 415, the orchestrator 130 executes instructions to assign cell groups 175 to accommodate the expected demand concentration by physical location and area. This may depend on the specific configurations of remote units 170 and their corresponding antennas. For example, certain remote units 170 and antennas may support different bands, allowing for more or fewer carrier aggregation opportunities. Further, orchestrator 130 may have access to history data corresponding to the physical RF environment of system 100 and each cell group 175. For example, a given cell group 175 may be in a physical location that has demonstrated to be more amenable to more MIMO opportunities than the locations of other cell groups 175. For example, a remote unit 170 antenna pattern may be located in among buildings with a lot of reflective surfaces, offering many MIMO opportunities. These MIMO opportunities may be a function of band. For example, a given RF environment for a given remote unit 170 antenna pattern may have many reflective surfaces but a lot of trees and other foliage, which may provide a reflection-rich environment (thus, greater MIMO opportunities) in lower frequency bands but greater attenuation in the millimeter wave bands.

In this case, depending on expected demand and the known RF environment, orchestrator 130 may select one remote unit 170 over another neighboring or overlapping remote unit 170 if it supports more bands or has a more advantageous antenna gain pattern. The result of step 415 is a set of selected remote units 170 to be activated, and the expected compute resources for each corresponding POI/DAS module 160 and BBU module 155. For example, for a remote unit 170 that supports many bands (greater carrier aggregation opportunities) and is expected to support many MIMO layers (based on the known RF environment), orchestrator 130 may predetermine the individual compute resource requirements for each BBU module 155: number of PHY module 250 threads, complexity of scheduler 230, etc.

Returning to FIG. 3, in step 315, orchestrator 130 executes instructions to allocate shared memory for each BBU module 155 for storing UE context data 191, a common set of data covering all necessary configuration and device-specific information for a given UE. The UE context data 191 array created by the orchestrator 130 should be in a shared memory with convenient access to a corresponding BBU module 155. The UE context data 191 template may common to all UEs, which may include UE information such as maximum allowable bit rate and band capabilities. Accordingly, given that the expected demand for connectivity is determined by the orchestrator 130 in step 305, the size of the UE context data 191 may an integer multiple of the size of a single UE context data template. Each UE context data template will get populated by the UEs that connect to the BBU module 155, and will each populated UE context data template will need to be accessed by the BBU module subcomponents: PDCP (Packet Data Convergence Protocol) component 210, a RLC (Radio Link Control) component 220, a MAC (Medium Access Control) component 230, and PHY (Physical layer) component 250. Each of these subcomponents may only need access to specific information within the populated UE context data template. Accordingly, orchestrator 130 may instantiate and configure each BBU module 155 such that its constituent subcomponents are configured to only have access to those memory regions within the UE context data template that it needs. Further to this, orchestrator 130 may provide access to a given BBU module's UE context data 191 to other BBU modules 155 and/or one or more optional coordinator modules 157. Providing access to other BBU modules enables coordination, such as Coordinated Multi-Point (COMP) and Intercell Interference Coordination (ICIC).

In step 320, fabric mapper 125 executes instructions to determine an appropriate set of interconnect channels within low latency switch fabric 120 to meet the demands of the collective set of component modules 105, and then sets up the interconnect channels. Each BBU module 155 will need a plurality of interconnect channels with each of the interface/router modules (e.g., in some cases, one for each bearer): with S1Mux 140 for communication with the MME 180; with M2Mux 135 for communication with the MCE 182; with GTPMux 145 for communication with the MBMS GW 187 and the SGW 185; and with X2Mux 150 for communication with one or more external eNodeBs 190. In the case of the X2 interface, it might yet be known how many X2 connections will be established with each BBU 155. It can be assumed that each of the BBUs modules 155 will have an X2 connection with each of its counterpart BBU modules 155, which would provide a baseline number of X2 interconnect channels for X2Mux 150. However, it is not likely known how many interconnect channels to one or more external eNodeBs 190 will be required. Accordingly, fabric mapper 125 may dynamically create and shut down interconnect channels between a given BBU module 155 and an external eNodeB 190 operationally as traffic demand changes. Further, depending on how each BBU 155 is to be coupled to its respective CPRI connection 160, each BBU may have an interconnect channel to a CPRI board via low latency switch fabric 120.

Further to step 320, fabric mapper 125 may allocate an array of dedicated memory to each interconnect channel, one for each direction of communication between the two component modules. These may be static shared data structures that may be implemented as shared memory within a given processor board, or as a data structure to be used for RDMA communications over an Infiniband link. Given the static nature of the fixed arrays, fabric mapper 125 may allocate their sizes so that they have an appropriate size that cannot be exceeded, but are not so large as to eliminate flexibility in dynamically allocating additional arrays for additional interconnect channels that might be needed as orchestrator instantiates additional component modules 105 as needs may arise.

In the example in which Infiniband is used, fabric mapper 125 may create a set of interconnect channels by defining a plurality of QPs (queue pairs), each QP defining a pair of endpoints of an interconnect channel (e.g., BBU1/S1Mux; BBU2/S1Mux; BBU1/GTPMux; etc.) and determining the service type for the corresponding send and receive queues (e.g., connection oriented vs. datagram; reliable vs. unreliable; etc.), service level, link bit rate (e.g., x1, x4, and x12, (i.e., Injection Rate Control)), and allocation of fabric partitioning. This may depend on the Device Category and QCI corresponding to a given bearer for which fabric mapper 125 is creating and assigning a QP. Further, depending on the nature of how each BBU 155 is to be coupled to its respective CPRI connection 160, fabric mapper 125 may define a plurality of QPs for each BBU and either a dedicated port of an integrated CPRI board. This would be in keeping with the configuration of system 100.

Fabric mapper 125 establishes the appropriate QPs by executing instructions to invoke the appropriate Infiniband-defined Verbs with low latency switch fabric 120 (in this example an Infiniband switch). More specifically, fabric mapper 125 invokes the appropriate Verbs with each Infiniband Host Channel Adaptor and sets up each component module 105 as being an Infiniband consumer, each consumer having a plurality of QPs.

Once fabric mapper 125 has determined the appropriate set of interconnect channels, it then executes instructions to create those interconnect channels with low latency switch fabric 120 and allocates the interconnect channels to the respective pairs of component modules 105.

In step 325, orchestrator 130 executes instructions to instantiate the component modules 105 required by system 100 to meet the estimated demand. In doing so, orchestrator 130 may instantiate the appropriate interface/router components (M2Mux, S1Mux, GTPMux, and X2Mux) as well as one or more BBU modules 155, based on the configuration data resulting from step 310 described above with regard to FIG. 4.

A factor to be considered in allocating and instantiating BBU modules 155 involves a balance between complexity of each BBU module 155 instantiation and the multi-threading opportunities of the hardware compute environment of system 100. For example, there may be an opportunity to cover a certain area within system 100 with a single large cell group 175 or with two or more smaller cell groups 175. In the former case, the compute resources required for the larger and more complex BBU module 155 may so large that the operating system of the hardware compute environment of system 100 might not be able to efficiently coordinate the processing of its thread(s) along with other competing threads of other component modules 105. In other words, the compute efficiency of a multiprocessor board (with multicore processors) may be diminished by the presence of an overly massive single BBU module 155 thread. In this case, it may provide for more efficient computing to have smaller, more numerous, and more manageable (from an OS multitasking perspective) BBU modules 155.

Further to step 325, each instantiated BBU 155 may have a dedicated CPRI connection 162, whereby each instantiation is configured to be coupled with one or more port addresses to a hardware CPRI board that is part of the compute hardware environment of system 100. Alternatively, each BBU 155 may be instantiated such that it has one or more dedicated interconnect channels with an integrated CPRI board via low latency switch fabric 120.

In a variation to system 100, orchestrator 130 may instantiate each BBU 155 in the form of individual component modules for each layer in the BBU's protocol stack. Accordingly, instead of instantiating a BBU 155, orchestrator may instantiate one PDCP module 210, one RLC module 220, one scheduler 230 and MAC module 240, and one PHY module 250 with multiple threads or with more than one PHY module 250. In this variant, fabric mapper 125 may determine, create, and assign interconnect channels for communication between then as they would communicate integrated as a BBU. In this case, BBU 155 would be de facto a BBU with Infiniband interconnect channels between each layer of the protocol stack.

Further to step 325, orchestrator 130 may instantiate different component modules 105 so that they share a hardware node (on the same server board), or are on different server boards, depending on the computational power demands of a given component module 105 and the stringency of latency and bandwidth requirements for communication between two or more component modules 105. For example, orchestrator 130 may execute instructions to instantiate POI/DAS modules 160 on the same server board on which the PCIe CPRI card is located to minimize latency between POI/DAS module 160 and the remote units 170.

Further to step 325, each instantiated component module 105 may register itself with the fabric mapper 125 so that the fabric mapper 125 may supply each component module 105 with the designated addresses and configuration information for its interconnect channels. Each component module 105 may communicate with the fabric mapper over its respective Ethernet connection 177 and Ethernet switch 110. With this, each component module 105 may establish connections with the other component modules 105 via Ethernet switch 110. For example, each BBU module 155 may execute instructions to register itself with the interface/router component modules: S1Mux 140, GTPMux 145, X2Mux 150, and M2Mux 135. Each of the interface/router component modules may then respectively configure themselves so that the pertinent cell IDs and other configuration information corresponding to each BBU module 155 is stored and correlated with the appropriate port addresses and configuration information (provided by fabric mapper 125) for the interconnect channels corresponding to that BBU module 155.

At the end of step 325, all of the component modules 105 are instantiated along with memory spaces reserved for UE context data 191, and all of the required interconnect channels across low latency switch fabric 120 are established.

In step 330, each of the POI/DAS 160 modules executes instructions to establish connections with its designated remote unit 170. In the exemplary embodiment in which each POI/DAS module 160 is coupled to its corresponding remote unit 170 via an intervening CPRI driver, each POI/DAS module 160 may execute instructions to set up and activate a data port for bidirectional communications with remote unit 170. This may be done with individual standalone CPRI connections between each POI/DAS—remote unit pair. Alternatively, system 100 may include a CPRI switch (not shown) that may serve as a router between each POI/DAS module 160 and each remote unit 170. According to another exemplary embodiment, the communication between each POI/DAS module 160 and its designated remote unit 170 may be over low latency switch fabric 120 (such as an Infiniband switch), each POI/DAS module 160 and corresponding remote unit 170 may bidirectionally send I/Q (in-phase/quadrature) data across a dedicated interconnect channel than may include a fiberoptic connection from the low latency switch fabric 120 to the remote unit 170. This may be done using a CPRI standard or a packet-based Ethernet protocol. In a variation in which one or more BBU modules 155 are directly coupled to one or more remote units 170, in step 330, each of these BBU modules 155 may establish connections with its designated remote unit 170 as described above.

In step 335, each BBU module 155 sets up its respective connection with the external network components 115 and the greater core network. For example, each BBU module 155 may perform LTE-specified functions to establish an S1 connection with one or more MMEs 180 to establish control plane communications with the MME 180 via S1Mux 140 via the interconnection channel set up within low latency switch fabric 120. Depending on how S1Mux 140 is configured, it may be that each BBU module 155 is not aware of the presence of S1Mux 140, which is acting transparently as an intermediary between it and MME 180. Once S1 control plane communications have been established between each BBU module 155 and MME 180, the MME 180 and given BBU module 155 may cooperatively continue the process of connecting each BBU module 155 to the external network components 115 via GTPMux 145 and M2Mux 135.

Further to step 335, the X2Mux module 150 may execute instructions to establish X2 connections between each of the BBU modules 150. This may occur dynamically during operation of system 100 as UEs connect to each BBU module 155 and identify one or more of the other BBU modules 155 of system 100 for potential handover. Alternatively, the X2 interfaces could be established at startup whereby each BBU module 155 may become aware of, and obtain the IP addresses of, the other BBU modules 155 as it connects to the Operation Support System (OSS) (not shown) in the core network and receives configuration data from the OSS. It will be understood that such variations are possible and within the scope of the disclosure.

Further to step 335, each BBU module 155 may execute instructions to establish an X2 connection with one or more external eNodeBs 190. This may be performed automatically on startup whereby orchestrator 130 issues a command to each BBU 155 to execute instructions to establish Automatic Neighbor Relations (as described above with regard to the other BBU modules 155). Alternatively, it may occur later during operation of system 100 whereby each BBU module 155 may be prompted to establish an X2 interface with an external eNodeB 190 by a connected UE, in which the connected UE indicates a strong signal from the external eNodeB 190. This may be done in accordance with 3GPP TS 36.300.

In step 340, each BBU module 155 establishes connections with the UEs within coverage of its corresponding cell group(s) 175. With an S1 interface established between each BBU 155 and the MME 180 via the S1Mux 140, each BBU module 155 executes instructions to generate MIB (Master Information Block) and SIB (System Information Block) information that it formats into a broadcast signal. Each BBU 155 then transmits the corresponding I/Q data via low latency switch fabric 120 to its corresponding POI/DAS module 160, which in turn transmits the I/Q data to the appropriate remote unit 170, which in turn broadcasts the MIB and SIB information to the UEs in range of its cell group 175.

Further to step 340, each in-range UE may receive the MIB and SIB information broadcast by a given BBU module 155 and respond in turn with an RRC Connection Request to the BBU module 155, which may respond in turn with an RRC Connection Setup message, and so forth, resulting in a distinct plurality of UEs in a connected state with each BBU module 155. As each UE connects with and establishes services via the external network components 115, all of the corresponding communications between the UE (via its BBU module 155) occurs through appropriate the interface/router components.

For example, communications between a given BBU module 155 and the SGW 185 occurs through GTPMux 145. In the example in which low latency switch fabric 120 is an Infiniband switch, the data for a given bearer may be relayed through a reliable RDMA QP, whereby BBU module 155 and GTPMux 145 may each write (or read) data from respective memory sectors in the other, allocated by fabric mapper 125, through Infiniband Channel Adaptors. A significant difference between this and conventional LTE communications is that here there is a single GTP interface (GTPMux 145) that acts like a router for multiple BBU modules 155.

As each UE connects itself to a given BBU module 155, the scheduler module 230 within BBU module 155 may retrieve the UE context data 191 acquired from the UE and populate a UE context data template with the retrieved data. The result is that the UE context data shared memory object will become an array of populated UE context data templates, one per connected UE, whereby each of the BBU module subcomponents: PDCP (Packet Data Convergence Protocol) component 210, RLC (Radio Link Control) component 220, MAC (Medium Access Control) component 230, and PHY (Physical layer) component 250, will have access to their respective required data within the UE context data template. Access may be through a dedicated interconnect channel within low latency switch fabric 120, although this is likely not necessary, given that the latency requirements for this type of data access is not so stringent.

Operation

Figure 5:
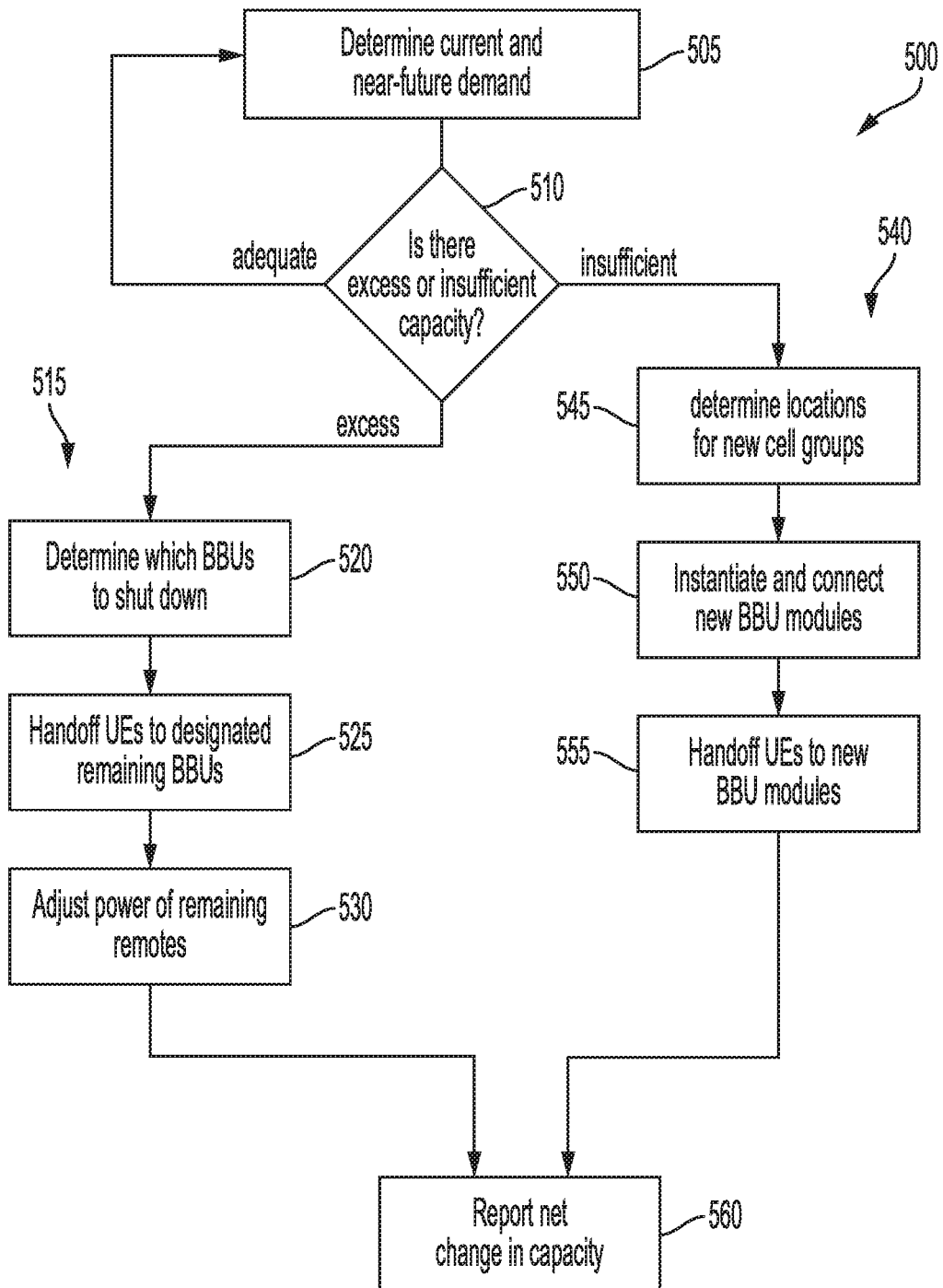
FIG. 5 illustrates an exemplary method of operation for the virtualized base station according to the disclosure.

FIG. 5 illustrates an exemplary process 500 by which system 100 operates, in which it performs the functions of a virtual base station while dynamically anticipating and responding to changes in demand for connectivity.

In step 505, orchestrator 130 executes instructions to determine the current and near future demand for connectivity for system 100. Step 505 may be substantially similar to step 305 of exemplary process 300. Additionally, given that system 100 is already running on any given iteration of step 505, orchestrator 130 may have accumulated historical data regarding the demand for connectivity and the responsive capacity and performance of system 100 since starting (since the execution of startup process 300). Orchestrator 130 may also regularly monitor the performance of each BBU module 155. Given this historical and performance data, orchestrator 130 may implement a look-ahead algorithm to determine near-future demand and volatility and compare that to the current capacity of system 100.

In step 510, orchestrator 130 may execute instructions to monitor the performance of system 100 (and each BBU module 155) as follows. Each BBU module 155 provides PMs (Performance Measurements) corresponding to each cell within system 100. The PMs include low level counter information: e.g., the number of UE connection attempts and successes, the number of attempted and successful initial context setup requests and responses. Each BBU module 155 may execute instructions to provide these PMs to the orchestrator 130.

Orchestrator 130 may use the reported PM data to identify any BBU modules 155 that are becoming overloaded, as well as any BBU modules 155 that are showing a consistent pattern in PMs to indicate that it has excess capacity and may be shut down. In the latter case, and there is an instance of excess capacity, process 500 proceeds to branch 515, in which the orchestrator may decide to shut down an underutilized BBU module 155 and perhaps its corresponding POI/DAS module 160 and remote unit 170, collectively making up a cell group 175.

In step 520, orchestrator 130 executes instructions to determine which cell group 175 to shut down, by determining which baseband module 155 and corresponding cell group 175 is underutilized. This may include determining if the UEs currently being serviced by an underutilized cell group 175 are close enough to being within range of another cell group 175 to enable a handoff without loss of coverage. If this is the case, process 500 proceeds to step 525.

In step 525, BBU module 115 of the cell group 175 to be terminated executes instructions to do an LTE intra-handover to the remaining cell group 175. It may do so using an X2 handover process. In this case, the source BBU module 155 sends the appropriate messages to the destination BBU module 155 via X2Mux 150. Once the handover is coordinated between the source (to be shut down) BBU module 155 and the destination (remaining) BBU module 155 is done, the destination BBU module 155 executes instructions to complete the handover by exchanging appropriate signaling between it and the MME 180 via S1Mux 140 and between it and the SGW 185 via GTPMux 145.

In step 530, orchestrator 130 may execute instructions to boost the power of the remaining cell group 175 that has accepted the UEs handed over from the underutilized cell group 175 to be shut down. This may be necessary in a venue, such as a stadium, in which the UEs connected to the remaining cell group 175 may be broadly physically dispersed. Alternatively, the remote unit 170 of the cell group 175 to be shut down may be synchronized and handed over to the remaining cell group 175 so that the remaining BBU module 155 may take control of both its original remote unit 170 and the remote unit 170 of the cell group 175 to be shut down. This may result in a greater cell group 175 that is scheduled by a single BBU module 155 that is powered by two or more remote units 170.

Figure 7:
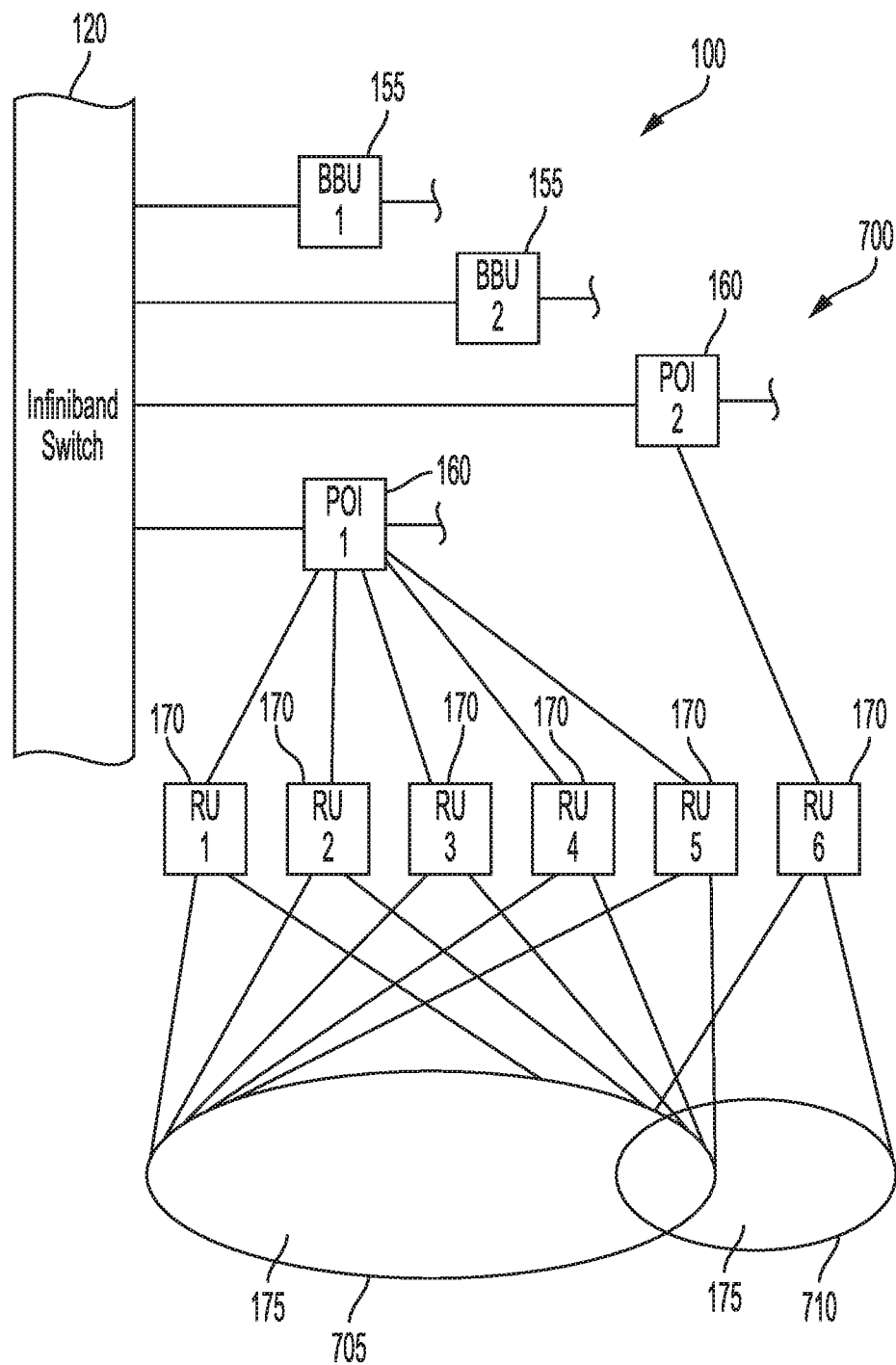
FIG. 7 illustrates an exemplary configuration during a low connectivity demand scenario.

FIG. 7 illustrates a reduced capacity configuration 700 of system 100. Only the relevant component modules are illustrated in FIG. 7, although it will be understood that the interface/router component modules and the external components are present, but not illustrated. In reduced capacity configuration 700, several cell groups 175 are merged into a greater cell group 705, which is driven by a single BBU module 155 and POI/DAS module 160. Also illustrated is a high-demand cell group 710, which has its own dedicated BBU module 155 and POI/DAS module 160. Although not illustrated this way, greater cell group 705 may be driven by a single (or fewer) remote units 170 that has had its power increased to compensate for its broader coverage area. It will be understood that such variations are possible and within the scope of the disclosure. In this case, the unused remote units 170 may be shut down. Further, it will be apparent that power savings may be achieved by reducing the number and complexity of component modules 105 in system 100.

Returning to FIG. 5, if the orchestrator 130 determines in step 510 that system 100 has insufficient capacity for the current or near future demand, then process 500 proceeds to branch 540, in which orchestrator 130 executes instructions to add capacity to system 100.

In step 545, orchestrator 130 executes instructions to determine the locations experiencing increasing demand for connectivity. In doing so, orchestrator 130 identifies overloaded cell groups 175 by identifying the BBU modules 155 that are reporting excessive demand from their reported Performance Measurements. With this information, orchestrator 130 identifies potential additional cell groups 175 by locating unused remote units 170 within that coverage area that may be shut down at the time. Orchestrator 130 may do so by executing instructions to query a database or configuration file listing the available remote units 170, their corresponding antennas (now shown), and the coverage areas of these antennas. Further, it may be the case that system 100 may be operating in a reduced capacity configuration 700 in which two or more remote units 170 within the coverage area of the area experiencing increasing demand may be operating redundantly, as illustrated in FIG. 7. In this case, one or more of these remote units 170 may be available to form one or more new cell groups 175 within the area experiencing increasing demand.

In step 550, orchestrator 130 executes instructions to instantiate one or more BBU modules 155 and corresponding POI/DAS modules 160 to form one or more new cell groups 175. The process to do this may be substantially similar to steps 320-335 disclosed above. The result of step 550 is a system 100 with one or more additional BBU modules 155 and POI/DAS modules 160, an array of shared memory for UE context data 191 for the expected number of additional UEs, and interconnect channels between the new BBU modules 155, POI/DAS modules 160, and the interface/router modules, and an X2 connection to the other BBU modules 155 via X2Mux 150.

In step 555, orchestrator 130 may execute instructions to have the BBU modules 155 experiencing increasing demand to have a certain number of their UEs perform an X2 handover to the one or more new BBU modules 155 and its corresponding cell group 175, thereby distributing the load among eligible cell groups 175.

Figure 8:
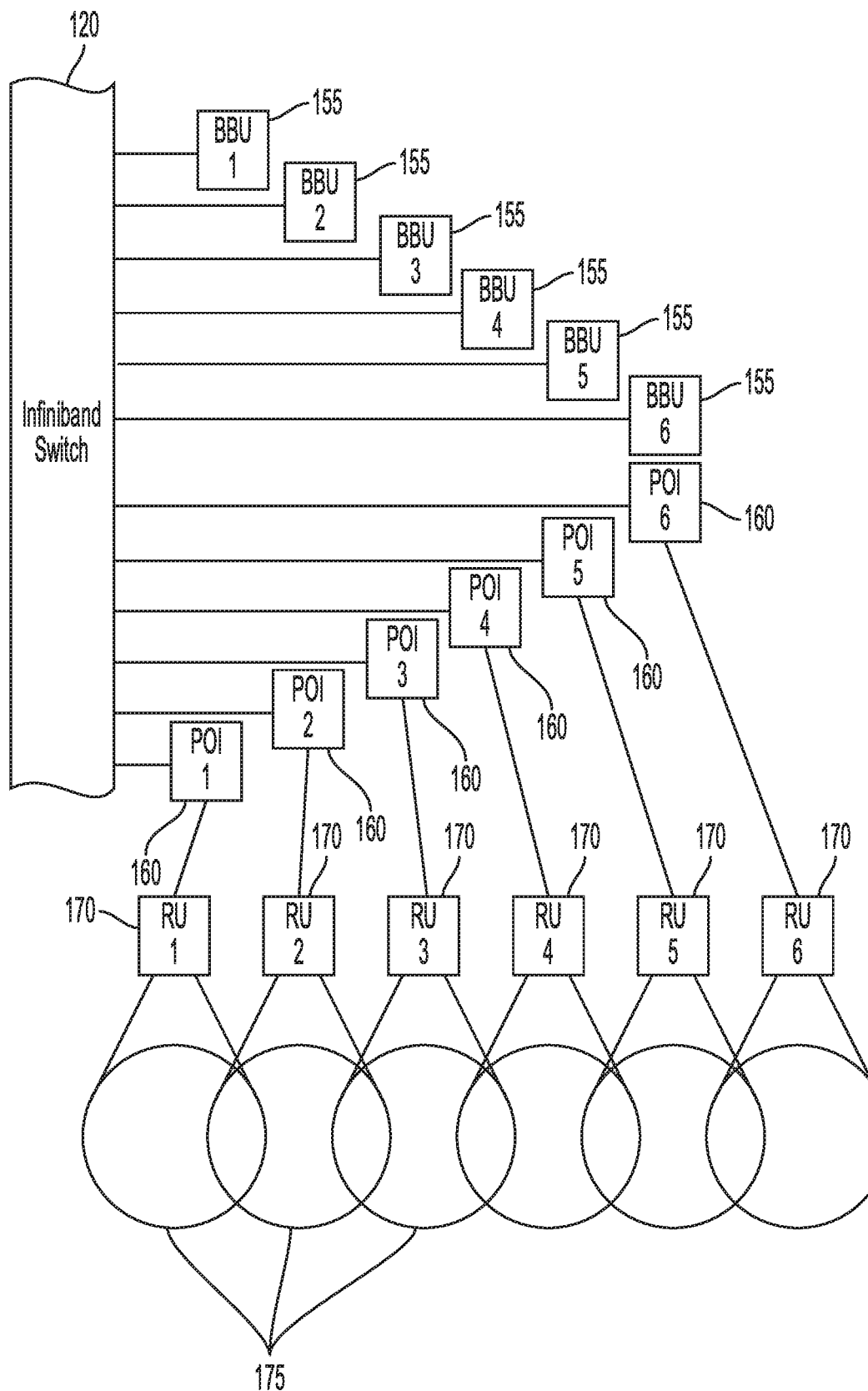
FIG. 8 illustrates an exemplary configuration during a high connectivity demand scenario.

FIG. 8 illustrates a maximum capacity configuration 800 of system 100, in which all of the cell groups 175 are distributed so that each cell group 175 is of minimal coverage area because each one is experiencing a high level of demand Each cell group 175 has a dedicated remote unit 170, which in turn has a dedicated POI/DAS module 160 and a corresponding dedicated BBU module 155.

Returning to FIG. 5, in step 560, orchestrator 130 may send a signal to the appropriate network operator's core network that system 100 has either increased or decreased its capacity in response to a change in demand. This may be useful information in that the network operator may then have the opportunity to appropriately reallocate network resources to/from system 100 in response to the changes.

Interference Mitigation

Intercell interference may arise among UEs that are located within the coverage area of two cell groups 175. System 100 provides opportunities for ICIC (Inter-Cell Interference Coordination) given the implementation of virtualized BBU modules 155 with the ability to communicate with very low latency.

Figure 6:
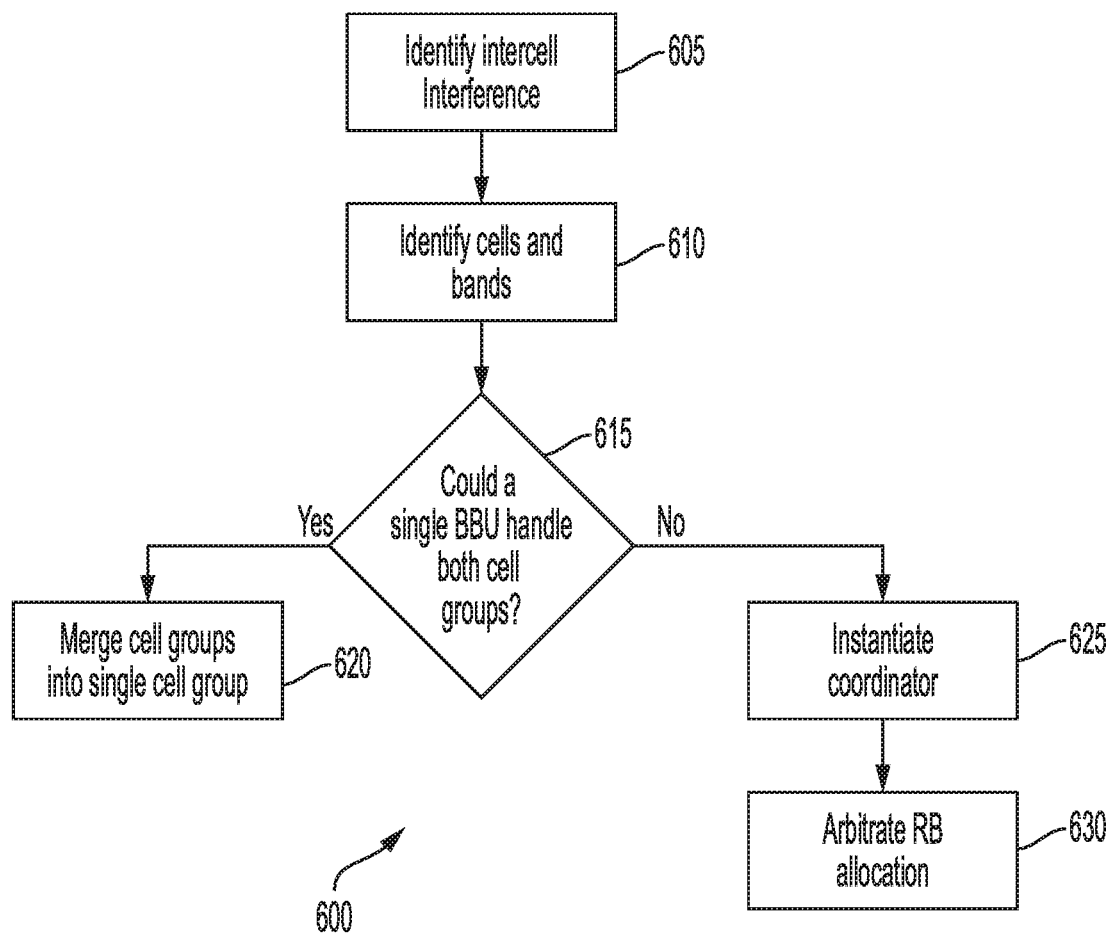
FIG. 6 illustrates an exemplary method for performing intercell interference mitigation according to the disclosure.

FIG. 6 illustrates an exemplary process 600 by which orchestrator 130 may provide for enhanced ICIC for adjacent cell groups 175, each transmitting unique data frames in a given TTI (Transmit Time Interval) in the same frequencies, In step 605, orchestrator 130 executes instructions to identify two cells interfering with each other at a given serving frequency. This may be done whereby two or more BBU modules 155 may provide Performance Measurements (as in step 510), or whereby orchestrator 130 otherwise receives indication from one or more BBU modules 155 that they are experiencing intercell interference at a given frequency. In step 610, orchestrator identifies which cell groups 175 are experiencing interference and at which frequency band.

In step 615, orchestrator 130 determines the number of connected UEs collectively communicating with the two or more interfering cells. If the total number of connected UEs is sufficiently below the number that would overload a collective cell group, orchestrator 130 may execute instructions to merge the interfering cell groups 175 into a larger master cell group 175. This may be done similarly to that described above with reference to steps 520-530 of process 500. This would result in a single BBU module 155 (and thus a single scheduler) handling all of the UEs that were experiencing intercell interference.

Returning to step 615, if the total number of connected UEs within the interfering cell groups 175 are such that it is not feasible to merge them into a single cell group 175, process 600 may proceed to step 625, in which orchestrator 130 executes instructions to instantiate one or more coordinator modules 157. Each coordinator module 157 is assigned to a serving frequency in which the intercell interference is occurring. Further, each coordinator module 157 comprises a set of machine-readable instructions that, when executed by one or more processors, provides for coordination between two or more interfering BBU modules 155 at a serving frequency identified by the orchestrator 130 in step 610, and implements one of two forms of coordination: intercell coordination, and intraframe coordination. In an exemplary embodiment, each coordinator module 157 may be implemented using a COE, such as Kubernetes. Alternatively, a single Kubernetes instance may orchestrate the creation, operation, and shutting down of a set of coordinator modules 157.

In intercell coordination, two BBU modules 155 may coordinate communication with UEs in overlapping coverage areas where the UE are located close together, both relatively close to the antenna of one cell group 175 and relatively far from the antenna of a second cell group 175. Under intercell interference coordination these UEs may both use the same resource blocks at the same frequencies. In this case, one UE is in communication with the nearby cell group 175 and the other is in communication with the relatively distant cell group 175. They are able to use the same resource blocks at the same frequencies because of the difference in delay time between them. Neither UE will be seeing the same resource blocks at the same time. Hence no intercell interference. In this case, two BBU modules 155 may coordinate the handling of UEs within overlapping coverage area. In this scenario, the coordinator module 157 may serve as a mediator in designating which UEs are to communicate with which cell group 175 to achieve this coordination. Further, coordinator module 157 may allocate resource blocks between the two interfering cell groups 175 such that at that one cell group would be allocated time-dependent coverage of the outer edge of its coverage area whereas the other cell group 175 would be preferentially allocated its inner coverage area.

Step 630 is an alternative to step 625 in that in step 630, the coordinator module 157 executes instructions to implement intra-frame coordination. In this case, coordinator module 157 communicates with the scheduler modules 230 of each of the interfering BBU modules 155 via an interconnect channel. The use of an interconnect channel in low latency switch fabric 120 may enable two different schedulers 230 to share a given frame on a TTI basis for those UEs that would otherwise cause intercell interference. This may be done independently as a function of serving frequency (e.g., a 10 MHz chunk of spectrum) so that there may be several coordinator modules 157, each handling a distinct 10 MHz band. In a variation to step 630, two different schedulers (BBU modules 155) may share a given frame, whereby one of the BBU modules 155 may implement a standard LTE protocol stack, and the other may be a special-purpose scheduler for IoT devices, such as CatM or NB-IoT. In this case, coordinator module 157 may reserve a specific set of resource blocks to the special-purpose scheduler so that the relative priorities of UEs being serviced by the two schedulers (the standard LTE BBU module 155 and the special purpose IoT BBU module 155) is maintained. This may prevent a situation in which an IoT-specific scheduler may otherwise reserve resource blocks over a sequence of subframes to enable coverage enhancement use whereby a single IoT UE with poor coverage may be given an inordinate number of resource blocks pre-emptively to allow for HARQ-related retransmissions (e.g., Coverage Enhancement). In this case, coordinator 157 may further function as an arbitrator to make sure that the resource blocks of the common LTE frame are properly provisioned between the LTE BBU module 155 and the special-purpose BBU module 155.

Although the above example describes system 100 as using an low latency switch fabric 120 for providing communications between component modules 105, it will be understood that this is an example, and that other inter-process communication techniques, standards, or technologies may be employed if they provide data communications with sufficient bandwidth, sufficiently low latency, and preferably no kernel involvement, are possible and within the scope of the disclosure.

What is claimed is:

1. A non-transitory machine readable memory encoded with instructions which, when executed by one or more processors, cause the one or more processors to perform a process, comprising:
   determining a demand for connectivity to a wireless communications access network;
   determining a combination of radio access network component modules based on the demand for connectivity, the combination of radio access network component modules including at least one baseband module and at least one of a plurality of functionally separate interface/router components, each of which are configured to perform communications with a corresponding one of a plurality of external, core network components;
   determining a plurality of interconnect channels between the at least one baseband module and the at least one interface/router component;
   instantiating each component module within the radio access network combination of component modules;
   connecting the at least one baseband module to at least one external, core network component via the at least one interface/router component to which the at least one external, core network component corresponds; and
   connecting the at least one baseband module to at least one user equipment (UE).

2. The non-transitory machine readable memory of claim 1, wherein each component module comprises:
   a connection to an Ethernet switch; and
   a connection to a low latency switch fabric.

3. The non-transitory machine readable memory of claim 2, wherein the low latency switch fabric comprises an Infiniband switch.

4. The non-transitory machine readable memory of claim 2, wherein the plurality of interface/router components are coupled to the at least one baseband module via the low latency switch fabric, and wherein each of the plurality of interface/router components is coupled to the corresponding one of the plurality of external network components via the Ethernet switch.

5. The non-transitory machine readable memory of claim 4, wherein the connecting the baseband module to at least one UE comprises:
   establishing a connection between a POI/DAS (Point of Interface/Distributed Antenna System) module and the baseband module over the low latency switch fabric; and
   establishing a connection between the POI/DAS module and a remote unit.

6. The non-transitory machine readable memory of claim 5, wherein the connection between the POI/DAS module and the remote unit comprises a CPRI (Common Public Radio Interface) connection.

7. The non-transitory machine readable memory of claim 4, wherein connecting the baseband module to at least one UE comprises establishing a connection between the at least one baseband module and a remote unit.

8. The non-transitory machine readable memory of claim 7, wherein the connection between the at least one baseband module and the remote unit comprises a CPRI (Common Public Radio Interface) connection.

9. The non-transitory machine readable memory of claim 8, wherein the CPRI connection comprises a CPRI switch coupled between the at least one baseband module and the remote unit.

10. The non-transitory machine readable memory of claim 2, wherein the at least one baseband module comprises a plurality of baseband modules.

11. The non-transitory machine readable memory of claim 10, wherein the instantiating each of the combination of component modules comprises allocating a shared memory for a plurality of UE context data.

12. The non-transitory machine readable memory of claim 10, wherein the connecting the baseband module to at least one UE comprises writing UE context data corresponding to the at least one UE to the shared memory.

13. The non-transitory machine readable memory of claim 10, wherein at least one of the plurality of baseband modules comprises an IoT (Internet of Things) scheduler component.

14. The non-transitory machine readable memory of claim 2, wherein the at least one baseband module comprises:
   a PDCP (Packet Data Convergence Protocol) component;
   an RLC (Radio Link Control) component;
   a scheduler component, wherein the scheduler component includes a MAC (Medium Access Control) component; and
   a PHY (Physical Layer) component,
   wherein the PDCP component and the PHY component are each coupled to the low latency switch fabric, and wherein the scheduler component is coupled to the Ethernet switch.

15. The non-transitory machine readable memory of claim 1, wherein the at least one interface/router component comprises an S1, X2, GTP (General Packet Radio Service Tunneling Protocol) or M2M (Machine-to-Machine) interface.

16. The non-transitory machine readable memory of claim 1, wherein determining the demand for connectivity to the wireless communications access network comprises:
  determining a current demand, a future demand, and a demand volatility.

17. The non-transitory machine readable memory of claim 16, wherein determining a future demand comprises at least one of an extrapolation of trend data and an estimation based on historical data.

18. The non-transitory machine readable memory of claim 16, wherein determining a demand volatility comprises a calculation of an expected deviation in demand over a limited period of time.

\* \* \* \* \*